United States Patent
Bravet et al.

(10) Patent No.: US 6,811,857 B1
(45) Date of Patent: Nov. 2, 2004

(54) PLASTIC GLAZING SHEET WITH ADDED OVERMOULDED PLASTIC MATERIAL

(75) Inventors: Jean-Louis Bravet, Thourotte (FR);
Rym Benyahia, Bobigny (FR);
Bernard Bureau, Louviers (FR);
Fabrice Ducreuzot, Crissey (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 09/736,021

(22) PCT Filed: Jun. 17, 1999

(86) PCT No.: PCT/FR99/01454

§ 371 (c)(1),
(2), (4) Date: Jul. 25, 2001

(87) PCT Pub. No.: WO99/65678

PCT Pub. Date: Dec. 23, 1999

(30) Foreign Application Priority Data

Jun. 19, 1998 (FR) .............................................. 98 07768

(51) Int. Cl.⁷ ............................ B32B 23/02; B32B 7/02; B32B 25/02; B32B 27/36; E06B 7/16
(52) U.S. Cl. ....................... 428/192; 428/213; 428/215; 428/297.1; 428/412; 49/490.1
(58) Field of Search ................................ 428/192, 213, 428/215, 297.1, 412; 49/490.1

(56) References Cited

U.S. PATENT DOCUMENTS

| 4,857,376 | A | | 8/1989 | Von Reis et al. |
| 4,894,972 | A | * | 1/1990 | Endoh et al. .................. 52/716 |
| 4,946,531 | A | | 8/1990 | Crouch et al. |
| 5,419,088 | A | * | 5/1995 | Raymond et al. ................ 51/1 |
| 2001/0041251 | A1 | * | 11/2001 | Bravet et al. ............... 428/213 |

FOREIGN PATENT DOCUMENTS

| DE | 2092511 A | 8/1982 |
| EP | 0255218 A | 2/1988 |
| EP | 0528711 A | 2/1993 |
| EP | 0728576 A | 8/1996 |
| FR | 2649749 A | 1/1991 |
| NL | 8501897 A | 2/1987 |
| WO | WO 98 29274 A | 7/1998 |

* cited by examiner

*Primary Examiner*—Cynthia H Kelly
*Assistant Examiner*—L. Ferguson
(74) *Attorney, Agent, or Firm*—Oblon, Spivak, McClelland, Maier & Neustadt, P.C.

(57) ABSTRACT

The invention concerns an essentially flat plastic product, at least partly transparent and whereof one part at least of the external surface consists of added overmoulded plastic material. The invention also concerns two methods for making said product, using injection moulding technique and the use of said product as glazing for transport vehicles or buildings.

21 Claims, No Drawings

PLASTIC GLAZING SHEET WITH ADDED OVERMOULDED PLASTIC MATERIAL

The present invention relates to products of plastic material which are substantially flat and transparent at least in part, which products, by virtue of their high optical quality, are suitable for application as glazings.

As regards the composition of special glazings, especially in the field of buildings or transportation vehicles, there are both advantages and disadvantages to the replacement of glass by a plastic material.

Plastic materials are lighter than glass, giving them a major advantage for electric-powered urban vehicles, inasmuch as increased self-sufficiency is crucial. In such vehicles, it is in fact conceivable that entire doors and even complete sides of the body, including the windows could be made of one-piece plastic material, and the lower portion thereof possible could be painted. In general, the light weight of transparent surfaces is interesting relative to modem transportation vehicles, inasmuch as technical progress is being accompanied by the integration of increasingly numerous functions in the glazing (rear-window heater, radio antenna, windshield defroster, color to prevent heating of the passenger space in strong sunlight, incorporation of electrochromic compounds, display of information on the windshield, etc.), and by never-ending growth of glazed surfaces. This is leading to generally greater vehicle weights, which has negative consequences for energy consumption.

In addition, plastic materials are capable of achieving improved safety conditions compared with glass and better protection against theft, because of their greater impact strength.

No less important an advantage of plastic materials compared with glass is their better ability to be easily transformed into complex shapes.

Finally, because of the ability of sheets of plastic material to be more or less deformed in reversible manner, it is conceivable that they can be installed in body openings in much simpler manner, with snap fastening from both the interior and exterior of the vehicle.

On the other hand, this relatively slight rigidity which has just been mentioned obviously constitutes a handicap compared with glass, as do the poorer transparency and optical properties and mainly the greater susceptibility to scratching.

Several approaches have been adopted heretofore in an attempt to overcome these three handicaps.

According to a first approach, flat strips of plastic material are formed by extrusion, a piece is cut to the required dimensions and fixed on a thermoforming device, and thermoforming is performed by contact with at least one solid mold surface, possibly with the assistance of compressed air or suction. The devices used are cumbersome and, in particular, excessively long. The outputs are relatively low and material losses are inevitable. High product quality is achieved only at the cost of laborious perfection of the process and possibly of an additional resurfacing treatment.

Furthermore, the susceptibility of plastic materials to scratching, as mentioned hereinabove, is such that shaped parts must be coated with a hard varnish for optical applications or for use in transparent elements.

The need therefore exists to guarantee optical quality superior to that obtained by the aforementioned extrusion, including after formation of the hard scratch-resistant coating, which must be performed under flawless perfect industrial conditions.

This constitutes the general scope of the invention, wherein it solves its own specific problem, which is substantially to improve the functions and therefore the possibilities for application and use of plastic glazings.

This objective is now achieved by the invention, the object of which is a substantially flat product of plastic material, transparent at least in part and at least part of the exterior surface of which comprises an overmolded addition of plastic material. In other words, the new glazing made available comprises substantially a first plastic material and at least one overmolded appendage of a second plastic material. In this way the different and desired physical properties of this second plastic material are used to best advantage: adhesion to the first plastic material, ability to undergo elastic deformation, imperviousness, durable crushing reversibility, rigidity, resistance to bending, mechanical strength (especially crushing or compressive strength), etc. The overmolded addition of plastic material may be disposed on either of the two faces of the flat product: this may be an interior rear-view mirror seat overmolded on a windshield of plastic material, or some kind of positioning, centering or locating appendage, or even a fixation pin.

According to a preferred alternative version, at least part of the addition of plastic material is encapsulated at the periphery of the product. This encapsulation may comprise, as the case may be, a peripheral seal, one lip of which perfectly conforms to the body opening and has a sealing function, a fixation pin, a stiffening peripheral strip, etc.

According to a preferred embodiment, the inventive product has a core of plastic material, a skin which comprises at least one film of plastic material supporting a scratch-resistant layer and is disposed on at least one face of the core, set back from the edges thereof, on the interior of the surface bounded by the encapsulated peripheral part of the addition of plastic material.

In this configuration, the core substantially takes on the mechanical properties, especially resistance to bending, in the composite that it forms with the skin or both skins, all the more so because these skins are thin, the thickness of each being, for example, on the order of 0.25 mm. The thickness of the core can be on the order of 1 to 10 mm. Its substance is chosen from among the thermoplastics such as polycarbonate, poly(methyl methacrylate), ethylene/vinyl acetate copolymer, poly(ethylene glycol terephthalate), poly (butylene glycol terephthalate), polycarbonate/polyester copolymers, polyurethane, cycloolefin copolymer of the ethylene/norbornene or ethylene/cyclopentadiene type, the ionomeric resins such as an ethylene/(meth)acrylate acid copolymer neutralized by a polyamine, the thermosetting or thermally cross-linking plastics such as polyurethane, unsaturated polyester, ethylene/vinyl acetate copolymer. There preferably will be chosen a conventional thermoplastic, preferably one that can be injection molded, which has a relatively low softening point and is inexpensive, such as polycarbonate. The core may also comprise an association of a plurality of thicknesses of any one or more of the aforesaid plastic materials.

The thickness of the skin or of each of the two skins is advantageously chosen to be at most equal to 500 μm, preferably between 50 and 300 μm, the skin comprising one or more films of thermoformable plastic material, between which there is interposed or on which there is deposited, depending on the case, at least one functional layer, at least one of these films also being able itself to comprise such a functional layer. The thermoformable plastic material of these films is advantageously chosen from the group comprising polycarbonate, polypropylene, poly(methyl methacrylate), ethylene/vinyl acetate copolymer, poly(ethylene glycol terephthalate), poly(butylene glycol terephthalate), polyurethane, polyvinylbutyral and cycloolefin copolymer such as ethylene/norbornene or ethylene/cyclopentadiene, polycarbonate/polyester copolymer, ionomeric resin.

The scratch-resistant layer has a thickness on the order of 1 to 10 µm; it generally forms the exterior surface of the inventive product.

It may be substantially inorganic and in particular comprise polysiloxanes and/or derivatives of silica and/or alumina, or it may be mixed, such as comprising networks of inorganic and organic molecular chains intermingled and cross-linked to one another by means of silicon-carbon bonds. Such a mixed layer exhibits excellent properties of transparency, adherence and scratch resistance. It seems that the inorganic network imparts to the coating its hardness and its scratch resistance, while the organic network imparts its elasticity and impact strength. Such varnishes are well known and have been described in published European Patent Applications 0524417 A1 and 0718348 A1, the content of :i which is incorporated herein by reference; some are designated in particular by the term "Ormocer", which is the abbreviation for "Organically Modified Ceramic". It is noteworthy that the curing temperature of the Ormocers is easily adapted by varying the relative proportions of the organic polymer fraction and the inorganic fraction. The use of a larger number of plastic materials for making the support film becomes possible.

The characteristic according to the preferred embodiment, wherein the skin or both skins are disposed on the faces of the core, set back from the edges thereof, and more precisely in the interior of the surface bounded by the encapsulated peripheral part of the addition of plastic material, is advantageous. It ensures, in fact, that best advantage can be taken of the excellent adhesion, to polycarbonate and other standard constituent materials of the core, of materials commonly used for the encapsulated addition, especially elastomeric thermoplastics.

The functional layers that may be integrated into a skin are of varied nature.

According to a first possibility, the exterior layer of the skin in contact with the environment contains a hydrophobic/oleophobic agent that therefore imparts this property to the exterior surface of the product. Well known hydrophobic/oleophobic agents include the fluorinated polysilanes, especially those obtained from precursors containing at one end a hydrolyzable function of the alkoxy or halo type, which permits chemical attachment to the substrate, and at the other end a perfluorinated carbon chain intended to comprise the exterior surface of the product.

In decreasing order of preference, the hydrophobic/oleophobic agent is incorporated into the scratch-resistant layer, which has a chemical structure close to its own, or with which it is at the very least chemically compatible, or is grafted in the form of a thin layer of thickness ranging from 2 to 50 nm, preferably on the scratch-resistant layer or else self-supported on a plastic film such as a poly(vinyl fluoride) (PVF) or poly(vinylidene fluoride) (PVDF), which can advantageously be applied directly on the scratch-resistant layer.

According to one alternative version, at least one decorative and/or masking layer covering all or part of the surface of the product is positioned in the skin, preferably directly under the support film of the scratch-resistant layer.

This layer can, for example, replace the screen-printed decoration frequently deposited at the periphery of the interior face of glazings, especially for motor vehicles, for the purpose of masking, from an observer situated outside the vehicle, the body elements forming the frame of the opening and also the strand of adhesive, which in this way is protected from degradation by ultraviolet radiation. It may contain opaque or transparent colored decorative elements, making it possible to introduce color elements matched to the body or to the interior equipment, logos, etc.

The skin may be provided with an adhesive layer, particularly on its interior face, to ensure fixation to the core but also between two films or layers of the skin. Common adhesives are polyvinylbutyral, polyurethane or the acrylic adhesives.

Among the main optional constituents of the skin there are also included the optically selective layers which, for example, are stacked under the decorative and/or masking layer or above this layer under the support film of the scratch-resistant layer, or else even above the scratch-resistant layer. These layers are characterized by high transmission in the visible region (wavelengths from 400 to 800 nm) and high absorption and/or reflection in the ultraviolet (<400 nm) and infrared (>800 nm) regions. These layers may comprise thin metallic layers, such as silver-base layers with thicknesses of between 2 and 35 nm, separated from one another as well as from other adjacent layers or films by dielectric layers of oxides or nitrides of indium, tin, silicon, zinc, titanium, tungsten, tantalum, niobium, aluminum, zirconium, etc., with thicknesses generally between 10 and 150 nm. These layers can contain at least one colored layer in the overall body.

The entirety of these layers may be electrically conductive; it may belong to the family of solar-screening stacks, used to limit the input of heat by sunlight in enclosed spaces, or to the family of low-emission stacks, used on the other hand to limit loss of heat from enclosed spaces, due mainly to transmission of infrared radiation through the glazing. Such stacks are described in French Patent 2708926 and European Patent 0678484.

According to another alternative version, the skin is provided with a stack of antireflective layers. This stack can contain, for example, an aluminum fluoride or oxyfluoride capable of being deposited in a thin layer by a vacuum or cathodic sputtering technique, possibly assisted by a magnetic field. Such a stack is described in French Patent 2745284, the content of which is incorporated here by reference.

According to other advantageous characteristics of the inventive product:
  the skin comprises an electrically conductive network which, for example, is included in an adhesive layer of polyvinylbutyral or polyurethane or is sandwiched between two such layers, and which assumes in known manner the heating-defrosting-defogging or antenna function;
  the substance of the encapsulated addition of plastic material is an elastomer such as a styrene/ethylene/butylene/styrene copolymer, possible modified, polyurethane, polyurethane-acrylic blend, chosen for its adhesion to the core, its elasticity, its impact strength, its color or its translucid nature as the case may be. In particular, it is thermoplastic. This substance does not require any preliminary treatment for priming the core.

The modified styrene/ethylene/butylene/styrene copolymers and the polyurethane-acrylic blends are particularly advantageous for their ability to adhere to plastic materials, especially to polycarbonate.

Another object of the invention is a first process for manufacture of the product described hereinabove, in which process the injection of a first and then a second plastic material is performed in a single mold, the first plastic material being that of the core and the second that of the encapsulated addition. This process has the merit of limiting the number of injection machines employed and the corresponding space requirement, and of shortening the manufacturing times, ultimately leading to increased outputs. Since the product is not subjected to any handling, subsequent dust-removal treatment is not needed.

As regards the speed of manufacture of the inventive product, this process advantageously comprises an operation in which the product of injection of the first plastic material is transferred by rotation from a first die, in which injection molding of the first plastic material was achieved as the first step, into a second die used for subsequent injection molding of the second plastic material. Of course, the scope of the invention also covers a process in which more than two plastic materials are injected successively in a single mold, each two successive injection operations being separated by an operation of transfer by rotation such as mentioned hereinabove. In the case of n injections, there can be used a mold comprising n dies distributed at an angular spacing of $2\pi/n$ relative to the axis of rotation. More precisely, it concerns a mold similar to the multi-injection mold with die-supporting rotating movable part or with rotary injection cylinder described in French Patent 2725152 B1, the content of which is incorporated here by reference.

According to a second process that also falls within the scope of the invention, the inventive product is obtained by injecting a first plastic material into a first mold and then transferring the product of this injection into a second mold, into which there is injected a second plastic material. This process does not exclude additional injection operations, each separated by a transfer or a manipulation of the product. Neither does it exclude a process comprising the successive steps of injection into a mold, removal of the injection product from this mold, transformation of this mold by removal of movable parts of volume corresponding to that of the following injection, repositioning of the injection product in this mold, and finally the following injection.

Furthermore, simultaneous or successive injection of a plurality of different plastic materials in fixed position of the mold is also among the possibilities opened up by the two inventive processes.

The processes of manufacture of the inventive product avoid the risk of insufficient optical quality of the products currently obtained by extrusion.

Preferably the skin or both skins together with their film of plastic material supporting a scratch-resistant layer first are formed in flat form on a support, such that their face provided with the scratch-resistant varnish in the course of formation is free of any mechanical contact, at least over their extent where optical quality is required. In this way there are achieved a state of cohesion of the skin and a degree of hardening of the scratch-resistant varnish which are intermediate and controllable. Depending on this state and on this degree, thermoforming of the skins is performed, still in the absence of any mechanical contact with the face provided with the scratch-resistant coating, or alternatively with contact. Thus forming of the skin and completion of hardening of the scratch-resistant coating are achieved simultaneously. The process culminating in perfect cohesion of the skin is completed while the skin is cooling.

The thermoformed skin or both skins are then advantageously held at the bottom of the mold by any appropriate means such as suction, blowing or electrostatic effect or possible several of those means together, before injection of the first plastic material constituting the core of the inventive product.

In the case in which the skin comprises an electrically conductive network, this is preferably formed beforehand by metal screen printing.

Finally, yet another object of the invention is application of the product described hereinabove as glazing for buildings or transportation vehicles, especially for motor vehicles.

The invention will be illustrated by the following examples.

EXAMPLE 1

On a film of 250 μm thickness of standard polycarbonate, which was prepared from Bisphenol A, sold by BAYER AG under the registered trademark "Makrolon", and which has a glass transition temperature $T_g$ equal to 145° C., there is deposited by flow coating the scratch-resistant coating described in the example of European Patent Application 0718348 A1 as a liquid film of 20 μm thickness. After drying, this thickness is reduced to 5 μm.

The coated support film is then placed at the bottom of a mold, the scratch-resistant layer being placed thereabove; the whole is subjected to heat treatment at 155° C. for 30 minutes. In this way a skin within the meaning of the preferred embodiment of the present invention is composed in almost its final form.

This is placed at the bottom of a first form, in which it is held by electrostatic effect, facing a first die of a double-injection mold with rotary injection cylinder provided with two dies in diametrically opposite position relative to the axis of rotation, as described in French Patent 2725152 B1 with reference to FIG. 2, the scratch-resistant layer being in contact with the wall of the mold. There is then carried out thermoplastic injection of a layer of 3.5 mm thickness of polycarbonate sold by GENERAL ELECTRIC under reference GE 121 R.

The rotary injection cylinder of the mold is turned by 180°, such that the polycarbonate injection product is repositioned on a second die. There is then injected a modified styrene/ethylene/butylene/styrene copolymer of Shore A hardness 75, in such a way as to form an overmolded profile over the entire periphery of the polycarbonate sheet.

After the first injection there is observed perfect adhesion of the polycarbonate of the core to that of the skin. This is confined to a surface situated in the interior of the peripheral strip intended to be covered by the encapsulated addition formed during the second injection. A crank-shaped structure in the bottom of the first form of the mold makes it possible to position the skin correctly before the first injection.

At the end of the second injection there is observed excellent adhesion of the encapsulated addition to the polycarbonate core.

EXAMPLE 2

The procedure of Example 1 is repeated with a film of 325 μm thickness of the same standard polycarbonate, provided on one face with a scratch-resistant coating sold by GENERAL ELECTRIC under reference HP 92.

Screen printing with an epoxy-base ink is performed around the periphery. The film is cut away following the screen printing. Its dimensions are such that it is set back relative to the edges of the subsequently injected core, as specified hereinabove.

The film is placed in the mold cavity. The polycarbonate core followed by the peripheral addition is then injected by operations identical to those of Example 1.

The final product has a transparency, an optical quality amply sufficient for application as glazing.

The inventive process offers the advantages inherent to the injection technique. The encapsulated addition does not necessarily cover the entire periphery of the core.

The excellent adhesion of the encapsulated addition to the polycarbonate core, already mentioned in Example 1, corresponds to a peeling force at 90° on the order of 100 N/cm, with cohesive rupture in the encapsulating substance (meaning that this substance tears in the thickness of the tongue used in the peeling test). By comparison with a common thermoplastic elastomer such as polypropylene or ethylene/propylene/diene monomer (EPDM) copolymer, the adhesion to primed glass corresponds to a peeling force at 90° of 30 to 40 N/cm, but it is almost zero to plastic material.

Furthermore, the inventive process does not exclude forming the core together with a peripheral bead to increase its rigidity, or with a relief and/or extensions such as ribs, profiles, feet or ears, and/or disposing one or more inserts, especially metallic, in the body of the plastic material. Such an arrangement is particularly useful for grasping or fixation of the inventive product as well as for the final mounting for which it is intended, as in a body opening of a motor vehicle. In this last case, the formation of adapted peripheral profiles makes it possible to envision mounting of the product from the interior of the vehicle, or in other words from the passenger space. The strand of adhesive is then disposed under the edge of the body opening and is not exposed to sunlight. Protection of the strand of adhesive by a varnish formed on the periphery of the interior face of the sheet naturally becomes superfluous.

The appendages formed on the periphery of the product during its injection can be retained or sawed off completely or partly according to their use. Sanding can be performed after such sawing.

A peripheral profile having geometry that is symmetric relative to the plane of the product may be useful, for example in the case of transparent side surfaces of transportation vehicles, since one part or the other of the profile can be sawed off subsequently depending on whether the transparent element is disposed on the right or left.

In addition, inserts may be associated if necessary with the incorporation of special functions into the product, such as a stop light in a rear window.

The inventive process is therefore economical, easy and reliable, and permits the use of numerous combinations of constituents without the occurrence of any problem of their compatibility, especially in terms of the temperatures at which they will be used. In particular, the use of a mold with a turning part makes it possible to obtain plastic glazings equipped with an encapsulation, especially of elastomer, with short manufacturing times and high outputs, for a minimal investment in apparatus and machinery, while maintaining the required optical quality.

What is claimed is:

1. A product comprising a sheet of plastic material, wherein the sheet is transparent at least in part and on at least part of the exterior surface of the sheet is disposed an overmolded plastic material,
    wherein the sheet comprises a plastic material core, and a skin disposed on at least one surface of the core and set back from the peripheral edges of the core, and the skin comprises at least one plastic film having a scratch-resistant layer disposed thereon.

2. A product according to claim 1, wherein at least part of the peripheral edge of the sheet is encapsulated by the overmolded plastic material.

3. A product according to claim 2, wherein the skin is set back from the edges of the overmolded plastic material.

4. A product according to claim 3, wherein the skin has a thickness that is at most 500 μm and further comprises one or more films of thermoformable plastic material and at least one functional layer.

5. A product according to claim 4, wherein the thermoformable plastic material is selected from the group consisting of polycarbonate, polypropylene, poly(methyl methacrylate), ethylene/vinyl acetate copolymer, poly(ethylene terephthalate), polyurethane, polyvinylbutyral, and cycloolefin copolymer.

6. A product according to claim 3, wherein the skin further comprises a hydrophobic/oleophobic agent which is incorporated into the scratch-resistant layer, grafted onto the scratch-resistant layer, or deposited on a plastic support film which is applied directly to the scratch-resistant layer.

7. A product according to claim 3, wherein the skin further comprises, over all or part of its surface, a decorative and/or masking layer.

8. A product according to claim 3, wherein the skin further comprises one or more optically selective layers.

9. A product according to claim 3, wherein the skin further comprises a stack of antireflective layers.

10. A product according to claim 3, wherein the skin further comprises an electrically conductive network.

11. A product according to claim 3, wherein the core comprises a thermoplastic material selected from the group consisting of polycarbonate, poly(methyl methacrylate), ethylene/vinyl acetate copolymer, poly(ethylene terephthalate), polyurethane, cycloolefin copolymer, and an ionomeric resin; a thermosetting or thermally cross-linking polyurethane, unsaturated polyester, or ethylene/vinyl acetate copolymer; or a plurality of layers of one or more of the thermoplastic or thermosetting or thermally cross-linking materials.

12. A product according to claim 2, wherein the overmolded plastic material comprises one or more elastomeric substances.

13. A process for preparing the product of claim 1, comprising:
    holding one or two skins, optionally thermoformed, at the bottom of a single mold, then
    injecting a first and then at least a second plastic material into the single mold.

14. A process according to claim 13, comprising an operation of transfer of the product of injection of the first plastic material by rotation from a first die, in which the injection of the first plastic material was achieved as the first step, into a second die used for subsequent injection of the second plastic material.

15. A process for preparing the product of claim 1, comprising injecting a first plastic material into a first mold and then transferring the resulting injection molded first plastic material into a second mold, and then injecting a second plastic material into the second mold.

16. A process according to claim 13, wherein said holding is carried out by suction and/or blowing and/or electrostatic effect.

17. A process according to claim 13, further comprising initially forming an electrically conductive network by metal screen printing.

18. A glazing for transportation vehicles or for buildings comprising the product of claim 1.

19. A product according to claim 7, wherein the decorative and/or masking layer is positioned directly under the support film of the scratch-resistant layer.

20. A product according to claim 12, wherein the elastomeric substance is thermoplastic.

21. The product according to claim 4, wherein the skin has a thickness of 50 to 300 μm.

* * * * *

UNITED STATES PATENT AND TRADEMARK OFFICE
CERTIFICATE OF CORRECTION

PATENT NO. : 6,811,857 B1
DATED : November 2, 2004
INVENTOR(S) : Bravet et al.

It is certified that error appears in the above-identified patent and that said Letters Patent is hereby corrected as shown below:

<u>Title page,</u>
Items [45] and [*] Notice, should read as follows:
-- [45]  Date of Patent:  *Nov. 2, 2004
  [*]    Notice:        Subject to any disclaimer, the term of this patent is extended or adjusted under 35 U.S.C. 154(b) by 0 days.

This patent is subject to a terminal disclaimer. --

Signed and Sealed this

Eighth Day of February, 2005

JON W. DUDAS
*Director of the United States Patent and Trademark Office*